(12) United States Patent
Matsumoto et al.

(10) Patent No.: US 6,610,761 B1
(45) Date of Patent: Aug. 26, 2003

(54) MOLDED RUBBER IRRADIATED WITH IONIZING RADIATION AND PROCESS FOR PRODUCING THE SAME

(75) Inventors: Kazuhisa Matsumoto, Settsu (JP); Yoshihiro Shirai, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/719,102

(22) PCT Filed: Jun. 1, 1999

(86) PCT No.: PCT/JP99/02928

§ 371 (c)(1),
(2), (4) Date: Dec. 8, 2000

(87) PCT Pub. No.: WO99/65975

PCT Pub. Date: Dec. 23, 1999

(30) Foreign Application Priority Data

Jun. 17, 1998 (JP) ............................................. 10-188158
Sep. 17, 1998 (JP) ............................................. 10-283391

(51) Int. Cl.$^7$ .............................. C08J 3/28; C08L 15/02
(52) U.S. Cl. ....................... 522/112; 522/111; 522/153; 522/156; 264/485; 264/488
(58) Field of Search ................. 264/485, 488, 264/496; 522/60, 111, 112, 153, 156

(56) References Cited

U.S. PATENT DOCUMENTS

| | | | | |
|---|---|---|---|---|
| 4,565,614 A | * | 1/1986 | Buding et al. ............... | 522/112 |
| 4,675,362 A | * | 6/1987 | Miyabayashi et al. ...... | 525/208 |
| 4,831,085 A | * | 5/1989 | Okabe et al. ............ | 525/326.3 |
| 5,053,450 A | * | 10/1991 | Coran ........................ | 524/506 |
| 5,151,492 A | * | 9/1992 | Abe et al. ................... | 526/206 |
| 5,430,103 A | * | 7/1995 | Ohata et al. ................. | 525/188 |
| 5,962,589 A | * | 10/1999 | Matsumoto et al. ........ | 525/199 |
| 6,191,233 B1 | * | 2/2001 | Kishine et al. ............. | 522/167 |

FOREIGN PATENT DOCUMENTS

| | | | |
|---|---|---|---|
| CA | 2090277 | * | 8/1993 |
| EP | 557840 A1 | | 9/1993 |
| EP | 796897 A1 | | 9/1995 |
| JP | 62-146932 A | | 6/1987 |
| JP | 6-41379 A | | 2/1994 |
| JP | 6-107826 A | | 4/1994 |
| JP | 9-67499 A | | 3/1997 |
| WO | 96/17890 A | | 6/1996 |
| WO | WO99/55778 | * | 4/1999 |

OTHER PUBLICATIONS

Patent Abstracts of Japan, Publication No. 06107826, Publication Date: Apr. 19, 1994.
Patent Abstracts of Japan, Publication No. 09067499, Publication Date: Mar. 11, 1997.
Patent Abstracts of Japan, Publication No. 62146932 A, Publication Date: Jun. 30, 1987.
Abstract, EP0557840, Publication Date: Sep. 1, 1993.

* cited by examiner

*Primary Examiner*—Susan W. Berman
(74) *Attorney, Agent, or Firm*—Kubovcik & Kubovcik

(57) ABSTRACT

The present invention provides an ionizing radiation irradiated rubber molded product and a process for preparing the same, the rubber molded product being prepared by irradiating with an ionizing radiation a preform comprising 5 to 95% by weight of a fluororubber containing vinylidene fluoride copolymerized therein in a proportion of 45 to 88 mole % and having a number average molecular weight of 5,000 to 200,000, and 95 to 5% by weight of an acrylic rubber.

7 Claims, No Drawings

MOLDED RUBBER IRRADIATED WITH IONIZING RADIATION AND PROCESS FOR PRODUCING THE SAME

TECHNICAL FIELD

The present invention relates to ionizing radiation irradiated rubber molded product and to a process for preparing the same.

BACKGROUND ART

Acrylic rubbers have higher heat resistance and oil resistance than conventional general-purpose rubbers and are in use for various kinds of industrial seal materials.

However, the acrylic rubbers are not fully satisfactory in compression set and heat resistance at temperatures not lower than 150° C. and are unusable for seal materials, hoses and electrical wires at such temperatures.

On the other hand, fluororubbers are excellent in heat resistance, compression set, oil resistance and resistance to chemicals and are useful in the field of industrial materials and other fields. Nevertheless, it appears unlikely that the fluororubbers will be used in remarkably increased quantities in spite of their outstanding properties since economy is not negligible for prevalent use in these fields. Additionally, fluororubbers have the drawback of deteriorating in the presence of additives (especially amine compounds) contained in engine oils.

Investigations were conducted to develop materials having the characteristics of both acrylic rubbers and fluororubbers by blending a common acrylic rubber with a common fluororubber and vulcanizing the blend for molding with use of vulcanizers for one or both of the rubbers, whereas the method failed to fully vulcanize one or both of the rubbers, giving products which were unsatisfactory in physical properties such as mechanical strength and compression set, heat resistance, and other properties.

Materials have been developed which render a fluororubber and an acrylic rubber peroxide-cocrosslinkable to overcome the foregoing drawbacks (WO 96/17890). Yet, products unsatisfactory in mechanical strength were obtained by crosslinking methods using conventional crosslinking agents.

An object of the present invention is to provide an ionizing radiation irradiated rubber molded product which is excellent in heat resistance, compression set, oil resistance, resistance to chemicals and resistance to additives and which is improved in mechanical strength.

DISCLOSURE OF THE INVENTION

The present invention provides an ionizing radiation irradiated rubber molded product as described below and a process for preparing the same.

The ionizing radiation irradiated rubber molded product of the present invention is prepared by irradiating with an ionizing radiation a preform comprising 5 to 95% by weight of a fluororubber containing vinylidene fluoride copolymerized therein in a proportion of 45 to 88 mole % and having a number average molecular weight of 5,000 to 200,000, and 95 to 5% by weight of an acrylic rubber.

Stated more specifically, the rubber molded product of the invention is prepared by preforming the following rubber composition, and irradiating the preform with an ionizing radiation.

According to the rubber molded product of the invention, examples of fluororubbers are vinylidene fluoride copolymers such as vinylidene fluoride/hexafluoropropylene, vinylidene fluoride/tetrafluoroethylene/hexafluoropropylene and vinylidene fluoride/chlorotrifluoroethylene; copolymers such as tetrafluoroethylene/propylene, hexafluoropropylene/ethylene and fluoro(alkyl vinyl ether)/olefin (for example, vinylidene fluoride/tetrafluoroethylene/perfluoroalkyl vinyl ether), etc. Preferable among these are elastomers of vinylidene fluoride/hexafluoropropylene and vinylidene fluoride/tetrafluoroethylene/hexafluoropropylene. The fluoro(alkyl vinyl ether) may contain a plurality of ether linkages. These fluororubbers are 5,000 to 200,000, preferably 50,000 to 170,000, in molecular weight, i.e., in number average molecular weight. The fluororubber fails to give satisfactory processability if exceeding 200,000 in molecular weight, while fully acceptable characteristics are unavailable after vulcanization if the molecular weight is lower than 50,000. The term processability means the vulcanization characteristics and amenability to rolling process and mold process. The proportion of copolymerized vinylidene fluoride in the fluororubber is 45 to 88 mole %, preferably 55 to 85 mole %.

The fluororubber is low in compatibility with acrylic rubbers and encounters difficulty in giving higher dispersibility to polymers and sufficient mechanical property is not obtained if less than 45 mole % in the proportion of copolymerized vinylidene fluoride. Impaired compression set will result if this proportion exceeds 88 mole %.

The peroxide-crosslinkable fluororubber has a crosslinking moiety in the molecule, such as iodine, bromine, double bond or the like which moiety will undergo crosslinking reaction in the presence of a peroxide radical.

The fluororubbers of the invention include, for example, iodine-containing fluororubbers, which will be described below.

The preferred examples of iodine-containing fluororubbers include a readily curable fluororubber (see JP-A-125491/1978) which is obtained by polymerizing vinylidene fluoride (VdF) and at least one of monomers comprising a fluorine-containing ethylenically unsaturated compound having 2 to 8 carbon atoms (and when required, a fluorine-free ethylenically unsaturated compound having 2 to 4 carbon atoms) in the presence of a radical generator and an iodine compound represented by the formula RIx (wherein R is a saturated or unsaturated fluorohydrocarbon group having 1 to 16 carbon atoms, chlorofluorohydrocarbon group or hydrocarbon group having 1 to 3 carbon atoms, and x, which is the number of bonds of R, is an integer of not smaller than 1). Useful iodine-containing fluororubbers are copolymers containing 45 to 88 mole %, preferably 55 to 85 mole %, of vinylidene fluoride (VdF) unit, 0 to 45 mole %, preferably 0 to 30 mole %, of tetrafluoroethylene (TFE) unit and 10 to 40 mole %, preferably 10 to 25 mole %, of hexafluoropropylene (HFP) unit.

The acrylic rubber for use in preparing the ionizing radiation irradiated rubber molded product of the present invention is preferably a multi-polymer rubber comprising (a) 30 to 99.9% by weight of (meth)acrylic alkyl ester and/or (meth)acrylic alkoxy-substituted alkyl ester, (b) 0.1 to 10% by weight of a crosslinkable monomer and (c) 0 to 70% by weight of other ethylenically unsaturated compound copolymerizable with the components (a) and (b).

Examples of the above (meth)acrylic alkyl ester to be used herein are, for example, compounds represented by the formula $$CH_2=C(R^1)COOR^2$$

wherein $R^1$ is a hydrogen atom or methyl, and $R^2$ is alkyl having 1 to 18 carbon atoms. Examples of such monomers are methyl (meth)acrylate, ethyl (meth)acrylate, n-propyl (meth)acrylate, n-butyl (meth)acrylate, isobutyl (meth) acrylate, n-pentyl (meth)acrylate, isoamyl (meth)acrylate, n-hexyl (meth)acrylate, 2-methylpentyl (meth)acrylate, n-octyl (meth)acrylate, 2-ethylhexyl (meth)acrylate, n-decyl (meth)acrylate, n-dodecyl (meth)acrylate and n-octadecyl (meth)acrylate. Among them, preferable are methyl acrylate, ethyl acrylate, n-propyl acrylate and n-butyl acrylate, and more preferable are methyl acrylate and ethyl acrylate.

Examples of the above (meth)acrylic alkoxy-substituted alkyl ester are compounds represented by the formula $$CH_2=(R^1)COO\text{-}A\text{-}O\text{-}R^3$$

wherein A is alkylene having 1 to 12 carbon atoms, $R^1$ is as defined above and $R^3$ is alkyl having 1 to 12 carbon atoms. Examples of such compounds are 2-methoxyethyl (meth) acrylate, 2-ethoxyethyl (meth)acrylate, 2-(n-propoxy)ethyl (meth)acrylate, 2-(n-butoxy)ethyl (meth)acrylate, 3-methoxypropyl (meth)acrylate, 3-ethoxypropyl (meth) acrylate, 2-(n-propoxy)propyl (meth)acrylate and 2-(n-butoxy)propyl (meth)acrylate. Among them, preferred are 2-methoxyethyl acrylate and 2-ethoxyethyl acrylate, and more preferred is 2-methoxyethyl acrylate.

Examples of the above crosslinkable monomer are dicyclopentadiene, ethylidenenorbornene, vinyl chloroacetate, allyl chloroacetate, 2-chloroethyl vinyl ether, vinyl (meth)acrylate, allyl (meth)acrylate, glycidyl (meth) acrylate, dimethyl stearyl vinylsilane, dicyclopentenyl (meth)acrylate, dicyclopentenyloxyethyl (meth)acrylate, alkyl glycidyl ether, vinyl glycidyl ether, 2-chloroethyl (meth)acetate, vinyl monochloroacetate, vinylnorbornene, acrylic acid, methacrylic acid and itaconic acid. There are used singly or in a mixture of at least two of them.

Examples of the above ethylenically unsaturated compound are unsaturated carboxylic acids such as acrylic acid, methacrylic acid, crotonic acid, 2-pentenic acid, maleic acid, fumaric acid and itaconic acid; alkyl vinyl ketone such as methyl vinyl ketone; vinyl or allyl ether such as vinyl ethyl ether and allyl methyl ether; vinyl aromatic compounds such as styrene, α-methylstyrene, chlorostyrene and vinyltoluene; α,β-unsaturated nitriles such as acrylonitrile and methacrylonitrile; unsaturated amides such as acrylamide, methacrylamide and N-methylolacrylamide; ethylene; propylene; vinyl chloride; vinylidene chloride; vinyl fluoride; vinylidene fluoride; vinyl acetate; and alkyl fumarate. Among these preferable are acrylonitrile, ethylene and vinyl acetate, and particularly preferable are acrylonitrile and ethylene.

As the acrylic rubber of the present invention, it is preferable to use an acrylic rubber obtained by copolymerizing, as a crosslinkable monomer, a polyfunctional monomer having (a) a functional group rendering the acrylic rubber peroxide-cocrosslinkable with the fluororubber and (b) a functional group effecting the copolymerization with a (meth)acrylic ester.

The polyfunctional monomer has at least two double bonds in the molecule and possesses (a) a functional group rendering the acrylic rubber peroxide-cocrosslinkable with the fluororubber and (b) a functional group effecting the copolymerization with a (meth)acrylic ester. Examples of polyfunctional monomers are ethylene glycol di(meth) acrylate, 1,4-butanediol di(meth)acrylate, 1,6-hexanediol di(meth)acrylate, polyethylene glycol di(meth)acrylate, allyl (meth)acrylate, divinylbenzene, triallylcyanurate and triallyl isocyanurate. Bifunctional monomers are desirable because use of a monomer having three or more functional groups is likely to present difficulty in controlling the proportion of partially crosslinked component in the resulting copolymer. When the monomer has only one double bond in the molecule, no crosslinking group remains in the acrylic rubber, which therefore is difficult to be cocrosslinked along with the fluororubber. More desirable among the bifunctional monomers are those wherein two double bonds are different in reactivity in order to permit one of the double bonds to remain in the acrylic rubber as a crosslinking group. More preferable is allyl (meth)acrylate. Although dihydrodicyclopentenyl acrylate and ethylidene norbornene are included in monomers wherein the two double bonds are different in reactivity, these are not usable singly and have to be used conjointly with allyl (meth)acrylate. This is because the bifunctional monomer must be fully crosslinkable with the same auxiliary crosslinking agent as is useful for the fluororubber.

The polyfunctional monomer is used in an amount of 0.1 to 1.5 wt. %, preferably 0.3 to 0.7 wt. %, based on the combined amount of (meth)acrylic ester, acrylonitrile and polyfunctional monomer. If a smaller amount of polyfunctional monomer is used, the acrylic rubber will not be crosslinked sufficiently, presenting difficulty in vulcanization molding and resulting in low heat resistance and poor mechanical properties. An excess of polyfunctional monomer, if used, produces an increased amount of partially crosslinked component in the copolymer, leads to impaired processability and causes vulcanization to result in an excessively high crosslinking density, consequently giving a material which is no longer flexible, impaired in elongation and unusable for materials such as an electric wire, hose, tube, seal or the like.

According to the rubber molded product of the invention, the ratio of the fluororubber to the acrylic rubber, i.e., flurororubber/acrylic rubber, is 5~95/95~5 by weight, preferably 10~90/90~10, more preferably 25~75/75~25. If a lesser amount of fluororubber is used, the resulting material will not have sufficiently improved heat resistance and oil resistance and will be impaired in processability including flowability, whereas an excess of the fluororubber is undesirable economically and brings low resistance to additives.

When required, a suitable auxiliary crosslinking agent may be used conjointly in order to accelerate crosslinking due to irradiation with ionizing radiation. As a rule, useful auxiliary crosslinking agents are not limited particularly in type insofar as they are reactive on polymer radicals. Examples of desirable agents are triallyl cyanurate, triallyl isocyanurate, triallylformal, triallyl trimellitate, dipropargyl terephthalate, diallyl phthalate, tetraallylterephthalamide, triallyl phosphate, bismaleimide, etc. Although the auxiliary crosslinking agent need not always be used, the amount thereof to be used is preferably 0.1 to 10 parts by weight, more preferably 0.3 to 5 parts by weight, per 100 parts by weight of the polymers to be used.

When crosslinking is carried out with heating in a preforming process, it is necessary to use singly or combinedly crosslinking agents conventionally employed for the fluororubber and/or acrylic rubber used, and it is optional to use singly or combinedly crosslinking auxiliaries conventionally employed for the fluororubber and/or acrylic rubber used.

For example, when using a peroxide-crosslinkable fluororubber and acrylic rubber in combination, it is preferable to use a crosslinking agent which readily generates peroxy radicals when heated or subjected to redox. Examples of such agents are 1,1-bis(tert-butylperoxy)-3,5,5-trimethylcyclohexane, 2,5-dimethylhexane-2,5-dihydroxy peroxide, di-tert-butyl peroxide, tert-butylcumyl peroxide, dicumyl peroxide, α,α'-bis(tert-butylperoxy)-p-diisopropylbenzene, 2,5-dimethyl-2,5-di(tert-butylperoxy) hexane, 2,5-dimethyl-2,5-di(tert-butylperoxy)hexyne-3, benzoyl peroxide, tert- butylperoxybenzene, 2,5-dimethyl-2,5-di(benzoylperoxy)hexane, tert-butylperoxymaleic acid, tert-butylperoxyisopropyl carbonate, etc. Preferable among these are dialkyl compounds. The kind of agent and the amount thereof to be used are determined in view of the amount of active —O—O— and the decomposition temperature. The amount is usually 0.1 to 15 parts by weight, preferably 0.3 to 5 parts by weight, per 100 parts by weight of the polymers (combined amount of acrylic rubber and fluororubber).

As a rule, useful auxiliary crosslinking agents are not limited particularly in type insofar as they are reactive on peroxy radicals and polymer radicals. Examples of desirable agents are triallyl cyanurate, triallyl isocyanurate, triacrylformal, triallyl trimellitate, dipropargyl terephthalate, diallyl phthalate, tetraallylterephthalamide, triallyl phosphate, bismaleimide, etc. Although the auxiliary crosslinking agent need not always be used, the amount thereof to be used is preferably 0.1 to 10 parts by weight, more preferably 0.3 to 5 parts by weight, per 100 parts by weight of the polymers to be used.

According to the rubber molded product irradiated with ionizing radiation of the invention, fillers, processing aids, antioxidants, age resistens, antiozonants, ultraviolet absorbers, flame retardants, etc. can be added to the composition when required.

Examples of useful fillers are magnesium oxide, calcium oxide, titanium oxide, silicon oxide, aluminum oxide and like metal oxides, magnesium hydroxide, aluminum hydroxide, calcium hydroxide and like metal hydroxides, magnesium carbonate, aluminum carbonate, calcium carbonate, barium carbonate and like carbonates, magnesium silicate, calcium silicate, sodium silicate, aluminum silicate and like silicates, aluminum sulfate, calcium sulfate, barium sulfate and like sulfates, synthetic hydrotalcite, molybdenum disulfide, iron sulfide, copper sulfide and like metal sulfides, kieselguhr, asbestos, lithopone (zinc sulfide/barium sulfate), graphite, carbon black, carbon fluoride, calcium fluoride, coke, etc.

Examples of processing agents are stearic acid, oleic acid, palmitic acid, lauric acid and like higher fatty acids, sodium stearate, zinc stearate and like higher fatty acid salts, stearic acid amide, oleic acid amide and like higher fatty acid amides, ethyl oleate and like higher fatty acid esters, stearylamine, oleylamine and like higher aliphatic amines, carnauba wax, ceresin wax and like petroleum wax, ethylene glycol, glycerin, diethylene glycol and like polyglycols, vaseline, paraffin and like aliphatic hydrocarbons, silicone oil, silicone polymers, low-molecular-weight polyethylene, phthalic acid esters, phosphoric acid esters, rosin, (halogenated) dialkylamines, (halogenated) dialkylsulfones, etc.

Examples of antioxidants, age resistens and antiozonants are 2,5-di-tert-amylhydroquinoline and like phenolic compounds, 2,2,4-trimethyl-1,2-dihydroquinoline and like amine-ketone compounds, 4,4'-bis (α,α'-dimethylbenzyl) diphenylamine and like aromatic secondary amine compounds.

Examples of ultraviolet absorbers are 2,4-dihydroxybenzophenone and like benzophenone compounds, bis(2,2,6,6-tetramethyl-4-piperidyl)sebacate and like amine compounds, 2-(2'-hydroxy-5'-methylphenyl) benzotriazole and like benzotriazole compounds.

Useful flame retardants include, for example, antimony trioxide, antimony pentoxide, sodium antiomonate, aluminum hydroxide, magnesium hydroxide, zinc borate, guanidine and like inorganic flame retardants, tris(chloroethyl) phosphate, tris(monochloropropyl)phosphate, tris (dichloropropyl)phosphate, triallylphosphate, halogen-containing condensed ester of organic phosphoric acid, ammonium polyphosphate, red phosphorus flame retardants and like esters of phosphoric acid and phosphorus compounds, chlorinated paraffin, chlorinated polyolefin, chlorinated polyethylene, perchlorocyclopenta-decane and like chlorine flame retardants, hexabromobenzene, decabromodiphenyl oxide, dibromoneopentyl glycol, tetrabromo-bisphenol A derivatives, tris-(2,3-dibromopropyl-1) isocyanurate, hexabromocyclodecane, brominated epoxy resins and like bromine flame retardants, etc. These flame retardants can be used either alone or in combination.

The rubber composition to be used for the ionizing radiation irradiated rubber molded product of the present invention can be prepared by a process using a conventional mixing device, such as a process wherein a fluororubber, an acrylic rubber and other components are mixed by an open roll mill or by an internal mixer or a process wherein the emulsion is coagulated. These processes may be carried out in combination.

The preform can be produced from the foregoing rubber composition by conventional methods, such as a method wherein the composition is heated and pressed by a mold, a method wherein the composition is forced into a heated mold and a method wherein the composition is extruded by an extruder. In the case of extrudates such as hoses and electrical wires, the extrudate can retain its shape after extrusion so that the preform obtained by extrusion without use of a crosslinking agent can be used as it is. Of course, it is possible to use a preform prepared by crosslinking using a crosslinking agent with heating by steam or the like. When a molded product such as O-rings, gaskets, oil seals, diaphragms or the like entails difficulty in retaining their shape in a non-crosslinked state after release from the mold, these moldings can be prepared from the preform prepared by crosslinking with a crosslinking agent.

According to the present invention, the obtained preform is irradiated with an ionizing radiation to undergo crosslinking reaction.

Ionizing radiations to be irradiated to the preform in the invention include, for example, X-rays, gamma rays, electron rays, proton rays, deuteron rays, alpha rays, beta rays and the like. The ionizing radiation is irradiated preferably in an inert gas or in a vacuum, although in the air with a good result.

An ionizing radiation is applied to the preform at a dose of preferably 5 to 500 kGy, more preferably 10 to 300 kGy. If the dose is less than 5 kGy, the application of ionizing radiation fails to satisfactorily improve the mechanical strength, whereas a dose of higher than 500 kGy results in accelerated degradation of polymer, partial cutting of intermolecular bond and lower mechanical strength. A dose ratio for improvement of mechanical strength is preferably 500 or more kGy/h, more preferably 1000 or more kGy/h.

Rubber moldings irradiated with an ionizing radiation according to the present invention can endure use under severe conditions and can be properly used for various purposes as is the case with fluororubbers, acrylic rubbers or blends thereof. The molded products of the invention have suitable properties for gaskets, contact-type or non-contact-type packings and like seals (self-seal packings, piston rings, separated ring-shaped packings, mechanical seals, oil seals, etc.), bellows, diaphragms, hoses, tubes, electrical wires, etc. which require resistances to heat, oil, fuels, LLC and steam, for automotive engine body, main kinetic system, kinetic valves, lubricating/cooling system, fuel system, suction/exhaustion system, transmission system for driving system, steering system on a chassis, braking system, basic electrical components for electrical equipment, electrical components for control system, electrical components for equipment, etc.

Stated more specifically, the rubber molded products of the invention can be used for the following purposes.

Rubber products for an engine body including cylinder head gaskets, cylinder head cover gaskets, oil pan packings, gaskets for general use, O-rings, packings, timing belt cover gaskets and like seals, control hoses and like hoses, rubber means for prevention of swinging an engine mount, etc.

Rubber products for main kinetic system, including crank shaft seals, cam shaft seals and like shaft seals, etc.

Rubber products for kinetic valves including valve stem oil seals for engine valves, etc.

Rubber products for lubricating/cooling system, such as hoses for engine oil coolers, oil return hoses, seal gaskets, etc., water hoses around radiators, oil hoses for vacuum pumps, etc.

Rubber products for fuel system such as oil seals for fuel pumps, diaphragms, valves, etc., filler (neck) hoses, hoses for supply of fuels, hoses for return of fuels, vaper (vaporable) hoses and like fuel hoses, in-tank hoses for fuel tanks, filler seals, tank packings, in-tank fuel pump mounts, etc., tube bodies for fuel tubes, connector O-rings, etc., injector cushion rings for fuel ejection devices, injector seal rings, injector-O-rings, pressure regulator diaphragms, check valves, etc., core valves for needle valves in carburetors, accelerating pump pistons, flange gaskets, control hoses, etc., valve sheets, diaphragms and the like for combined air control (CAC) apparatus, etc.

Rubber products for suction and exhaustion system such as intake manifold packings and exhaust manifold packings for manifold devices, diaphragms, control hoses, emission control hoses, etc. for EGR (exhaust gas recycle), diaphragms for back pressure transducers (BPT), etc., valve sheets for preventing afterburn (AB) in afterburn valves, etc., throttle body packings for throttles, turbo-oil hoses (supply), turbo-oil hoses (return), turbo-air hoses, intercooler hoses, turbine shaft seals, etc. for turbochargers, etc.

Rubber products for transmission system such as transmission-related bearing seals, oil seals, O-rings, packings, torque converter hoses, etc., mission oil hoses, automatic transmission fluid (ATF) hoses, O-rings, packings, etc. for AT (automatic transmission), etc.

Rubber products for steering system such as power steering oil hoses, etc.

Rubber products for brake system such as oil seals, O-rings, packings, brake oil hoses, etc., air valves, vacuum valves, diaphragms, etc. for master backs, piston cups (rubber cups), caliper seals, boots, etc. for master cylinder, etc.

Rubber products for basic electrical components such as insulators and sheaths for electrical wires (harness), tubes for harness exterior components, etc.

Rubber products for electrical components in control system such as coating materials for sensor wires, etc.

Rubber products for electrical components in equipment such as O-rings, packings, cooler hoses, etc. for automotive air conditioners.

Rubber products for other machinery than automobiles including, for example, packings, O-rings, hoses and other seal materials, insulators and sheaths for electrical wires, diaphragms, valves, etc. for resistances to oil, chemicals, heat, steam and weather in ships, aircraft and like transportation means, similar packings, O-rings, seal materials, insulators and sheaths for electrical wires, diaphragms, valves, hoses, rolls, tubes, coatings or linings for resistance to chemicals, etc. in chemical plants, similar packings, O-rings, hoses, seal materials, insulators and sheaths for electrical wires, belts, diaphragms, valves, rolls, tubes, etc. in machinery in food plants and devices for foods (including household devices), similar packings, O-rings, hoses, seal materials, insulators and sheaths for electrical wires, diaphragms, valves, tubes, etc. in devices of nuclear power plants, similar packings, O-rings, hoses, seal materials, insulators and sheaths for electrical wires, diaphragms, valves, rolls, tubes, linings, mandrels, flexible joints, belts, rubber plates, weather strips, roll blades for PPC copying machines, etc. in general industrial components, and so on.

BEST MODE OF CARRYING OUT THE INVENTION

The invention will be described below in greater detail with reference to the following examples and comparative examples. Parts are all by weight.

a) Polymerization of Acrylic Rubber

Into a separable flask equipped with a thermometer, stirrer, nitrogen supply tube and evacuating device were placed 480 parts of water, 0.24 part of sodium bicarbonate, 0.48 part of sodium laurylsulfate, 0.48 parts of Nonipole 200 (polyoxyethylene nonylphenyl ether) and 100 parts of monomer mixture of Table 1, the oxygen within the system was thoroughly removed by repeating evacuation and nitrogen replacement, and 0.01 part of sodium hydrosulfite, 0.002 part of sodium formaldehyde sulfoxylate and 0.005 part of tert-butyl hydroperoxide were thereafter placed in to start a polymerization reaction at 50° C. The reaction was continued for 6 hours so as to achieve a polymerization conversion within the range of 95 to 99%, followed by salting-out of the reaction mixture, sufficient washing with water and drying to obtain an acrylic rubber. Incidentally, EA stands for ethyl acrylate, BA for butyl acrylate and AN for acrylonitrile. "Acrylic ester A," brand name of Mitsubishi Rayon Co., Ltd. was used as it was as allyl methacrylate (hereinafter abbreviated as "AMA")

TABLE 1

| Acrylic rubber amount (wt. %) | A-1 |
|---|---|
| EA | 29.3 |
| BA | 68.5 |
| AN | 1.9 |
| AMA | 0.3 | b) Polymerization of Fluororubber

Into a polymerization reactor made of stainless steel and having a capacity of 3 liters were placed 1 liter of pure water and 2 g of $C_7F_{15}COONH_4$ serving as an emulsifier, the interior of the system was fully replaced by nitrogen gas, and an initial monomer mixture of VdF/HFP/TFE was forced into the reactor at 80° C. to an internal pressure of 16 kg/cm² G. Subsequently, 10 ml of a 0.2 wt. % aqueous solution of ammonium persulfate was forced in to start a reaction.

Since the pressure dropped with the progress of the polymerization reaction, $I(CF_2)_4I$ serving as a molecular weight adjusting agent was forced in upon a pressure drop to 15 kg/cm² G. When the pressure further dropped to 14 kg/cm² G, the system was repressurized with a continuous monomer mixture of VdF/HFP/TFE to the pressure of 16 kg/cm² G. The aqueous solution of ammonium persulfate was forced into the system with nitrogen gas every 3 hours in an amount of 10 ml each time to continue the reaction with repeated decrease and increase in the pressure to obtain an aqueous emulsion.

To the emulsion was added a 5 wt. % aqueous solution of potash alum for coagulation, and the coagulated product was washed with water and dried to obtain a rubberlike copolymer. The initial monomer mixture, the amount of $I(CF_2)_4I$, continuous monomer mixture, reaction time and yield are listed in Table 2, in which 2F stands for VdF (vinylidene fluoride), 4F for TFE (tetrafluoroethylene) and 6F for HFP (hexafluoropropylene).

TABLE 2

| fluororubber | | F-1 |
|---|---|---|
| initial monomer mixture (mol. %) | 2F | 48 |
| | 4F | 11 |
| | 6F | 41 |
| $I(CF_2)_4I$ (g) | | 0.6 |
| continuous monomer mixture (mol. %) | 2F | 67 |
| | 4F | 16 |
| | 6F | 17 |
| reaction time (hr) | | 13 |
| yield (g) | | 216 |

The number average molecular weight of the copolymer and Mooney viscosity ($ML_{1+10}$, 100° C.) were determined by the following method.

[Conditions for Determining Molecular Weight]

Gel permeation chromatograph: High performance GPC device, HLC-8020 (product of Toso Co., Ltd.)

Columns: TSK guard column Hhr-H (one),

TSK gel-G5000H, -G4000H, -G3000H, -G2000H (one each) (products of Toso Co., Ltd.)

Sensor: RI sensor (differential reflectometer) incorporated in HLC-8020

Data analysis: Supersystem Controller SC-8020 (product of Toso Co., Ltd.)

Developer solvent: Tetrahydrofuran

Temperature: 35° C.

Concentration: 0.5 wt. %

Standard polymers for molecular weight calibration curve: Monodisperse polystyrenes, TSK standard POLY-STYREN [Mw/Mn=1.14 (max)] (product of Toso Co., Ltd.)

The composition of the copolymer was determined by 19F NMR measurement.

Mooney viscosity was measured according to JIS K-6300.

TABLE 3

| fluororubber amount (mole %) | F-1 |
|---|---|
| 2F | 67 |
| 4F | 16 |
| 6F | 17 |
| number average molecular weight (×10000) | 13 |
| $ML_{1+10}$, 100° C. | 80 |

EXAMPLES 1 to 9

A fluororubber, an acrylic rubber and other components in the amounts shown in Table 4 were kneaded by an open roll mill, placed into a mold, compressed and preformed at 100° C. to form a sheet. The obtained preform was irradiated in the air with an ionizing radiation to give a molded product. Seast 116 is carbon black of the MAF type manufactured by Tokai Carbon Co., Ltd., TAIC is triallyl isocyanurate manufactured by Nihon Kasei Co., Ltd., Perhexa 25B is a peroxide manufactured by Nippon Oils & Fats Co., Ltd. and Naugard 445 is an age resistor manufactured by Uniroyal Chemical Co., Ltd. The properties of obtained molded product were evaluated according to JIS K-6301.

TABLE 4

| Example | 1 | 2 | 3 | 4 | 5 |
|---|---|---|---|---|---|
| amount (weight) | | | | | |
| F-1 | 30 | 30 | 30 | 30 | 50 |
| A-1 | 70 | 70 | 70 | 70 | 50 |
| amount (weight) | | | | | |
| Polymer | 100 | 100 | 100 | 100 | 100 |
| Stearic acid | 1 | 1 | 1 | 1 | 1 |
| Seast 116 | 50 | 50 | 50 | 50 | 40 |
| TAIC | 0 | 0 | 1 | 1 | 0 |
| Naugard 445 | 1 | 1 | 1 | 1 | 1 |
| dose of ionizing radiation (kGy) | 50 | 100 | 50 | 100 | 50 |
| irradiation time (min.) | 11 | 22 | 1.1 | 2.2 | 1.1 |

| Example | 6 | 7 | 8 | 9 |
|---|---|---|---|---|
| amount (weight) | | | | |
| F-1 | 50 | 50 | 50 | 70 |
| A-1 | 50 | 50 | 50 | 30 |
| amount (weight) | | | | |
| Polymer | 100 | 100 | 100 | 100 |
| Stearic acid | 1 | 1 | 1 | 1 |
| Seast 116 | 40 | 40 | 40 | 30 |
| TAIC | 0 | 1 | 1 | 1 |
| Naugard 445 | 1 | 1 | 1 | 1 |
| dose of ionizing radiation (kGy) | 100 | 50 | 100 | 100 |
| irradiation time (min.) | 2.2 | 1.1 | 2.2 | 2.2 |

TABLE 5

| Example | 1 | 2 | 3 | 4 | 5 |
|---|---|---|---|---|---|
| Physical properties in original state | | | | | |
| 100% modulus | 3.0 | 3.7 | 3.1 | 4.8 | 2.4 |
| Tensile strength (MPa) | 10.3 | 10.6 | 10.7 | 12.1 | 13.0 |
| Elongation (%) | 360 | 240 | 360 | 240 | 460 |
| Hardness (JISA) | 67 | 67 | 67 | 70 | 68 |

| Example | 6 | 7 | 8 | 9 |
|---|---|---|---|---|
| Physical properties in original state | | | | |
| 100% modulus | 3.4 | 2.8 | 4.6 | 3.8 |
| Tensile strength (MPa) | 15.2 | 15.6 | 16.6 | 17.0 |
| Elongation (%) | 320 | 360 | 270 | 410 |
| Hardness (JISA) | 68 | 69 | 70 | 67 |

COMPARATIVE EXAMPLES 1 to 9

A fluororubber, an acrylic rubber and other components in the amounts shown in Table 6 were kneaded by an open roll mill, placed into a mold, compressed and preformed at 100° C. to form a sheet. The obtained preform was irradiated in the air with an ionizing radiation to give a molded product. The properties of obtained molded product were evaluated in the same manner as in Examples.

TABLE 6

| Comparative Example | 1 | 2 | 3 | 4 | 5 |
|---|---|---|---|---|---|
| amount (weight) | | | | | |
| F-1 | | | | 100 | 100 |
| A-1 | 100 | 100 | 100 | | |
| amount (weight) | | | | | |
| Polymer | 100 | 100 | 100 | 100 | 100 |
| Stearic acid | 1 | 1 | 1 | 1 | 1 |
| Seast 116 | 65 | 65 | 65 | 10 | 10 |
| TAIC | 1 | 1 | 1 | 4 | 4 |
| Naugard 445 | 1 | 1 | 1 | 0 | 0 |
| dose of ionizing radiation (kGy) | 0 | 50 | 100 | 0 | 50 |
| irradiation time (min.) | 0 | 1.1 | 2.2 | 0 | 1.1 |

| Comparative Example | 6 | 7 | 8 | 9 |
|---|---|---|---|---|
| amount (weight) | | | | |
| F-1 | 100 | 30 | 50 | 70 |
| A-1 | | 70 | 50 | 30 |
| amount (weight) | | | | |
| Polymer | 100 | 100 | 100 | 100 |
| Stearic acid | 1 | 1 | 1 | 1 |
| Seast 116 | 10 | 50 | 40 | 30 |
| TAIC | 4 | 1 | 1 | 1 |
| Naugard 445 | 0 | 1 | 1 | 1 |
| dose of ionizing radiation (kGy) | 100 | 0 | 0 | 0 |
| irradiation time (min.) | 2.2 | 0 | 0 | 0 |

TABLE 7

| Comparative Example | 1 | 2 | 3 | 4 | 5 |
|---|---|---|---|---|---|
| Physical properties in original state | | | | | |
| 100% modulus | 0.4 | 2.6 | 3.6 | 1.2 | 2.1 |
| Tensile strength (MPa) | 0.9 | 3.1 | 4.3 | 1.7 | 17.2 |
| Elongation (%) | 120 | 160 | 140 | 250 | 280 |
| Hardness (JISA) | 59 | 62 | 65 | 65 | 70 |

| Comparative Example | 6 | 7 | 8 | 9 |
|---|---|---|---|---|
| Physical properties in original state | | | | |
| 100% modulus | 2.4 | 1.3 | 1.2 | 1.0 |
| Tensile strength (MPa) | 17.6 | 1.7 | 1.8 | 1.8 |
| Elongation (%) | 250 | 940 | 590 | 360 |
| Hardness (JISA) | 67 | 64 | 65 | 65 |

COMPARATIVE EXAMPLES 10 to 14

A fluororubber, an acrylic rubber and other components in the amounts specified in Table 8 were kneaded by an open roll mill. The obtained composition was vulcanized on a press at 160° C. for 20 minutes and further vulcanized in an oven at 180° C. for 4 hours to obtain a molded product in the form of a sheet.

TABLE 8

| Comparative Example | 10 | 11 | 12 | 13 | 14 |
|---|---|---|---|---|---|
| amount (weight) | | | | | |
| F-1 | | 30 | 50 | 100 | 70 |
| A-1 | 100 | 70 | 50 | | 30 |
| amount (weight) | | | | | |
| Polymer | 100 | 100 | 100 | 100 | 100 |
| Stearic acid | 1 | 1 | 1 | 1 | 1 |
| Seast 116 | 65 | 50 | 40 | 10 | 30 |
| TAIC | 1 | 1 | 1 | 4 | 1 |
| Perhexa 25B | 1.5 | 1.5 | 1.5 | 1.5 | 1.5 |
| Naugard 445 | 1 | 1 | 1 | 0 | 1 |
| dose of ionizing radiation (kGy) | 0 | 0 | 0 | 0 | 0 |

TABLE 9

| Comparative Example | 10 | 11 | 12 | 13 | 14 |
|---|---|---|---|---|---|
| Physical properties in original state | | | | | |
| 100% modulus | 3.8 | 3.6 | 3.9 | 2.3 | 3.1 |
| Tensile strength (MPa) | 7.5 | 8.9 | 9.4 | 28.3 | 11.2 |
| Elongation (%) | 170 | 240 | 260 | 420 | 450 |
| Hardness (JISA) | 66 | 69 | 72 | 66 | 65 |

INDUSTRIAL APPLICABILITY

With use of the ionizing radiation irradiated rubber molded product of the present invention, it is possible to provide a molded product which is improved in mechanical strength and which is excellent in heat resistance, oil resistance, resistance to fuel, resistance to chemicals and resistance to additives.

What is claimed is:

1. A rubber molded product obtained by irradiating with an ionizing radiation in a dose of 5 to 500 kGy a preform comprising 5 to 95% by weight of a fluororubber containing vinylidene fluoride copolymerized therein in a proportion of 45 to 88 mole % and having a number average molecular weight of 5,000 to 200,000 and 95 to 5% by weight of an acrylic rubber.

2. A rubber molded product as defined in claim 1 wherein the fluororubber is a peroxide-crosslinkable one.

3. A rubber molded product as defined in claim 1 wherein the acrylic rubber is one obtained by copolymerizing, in an amount of 0.1 to 1.5 wt. %, a polyfunctional monomer having a functional group rendering the acrylic rubber peroxide-cocrosslinkable with the fluororubber, and a functional group effecting the copolymerization with a (meth) acrylic ester respectively.

4. A rubber molded product as defined in claim 3 wherein the polyfunctional monomer is allyl (meth)acrylate.

5. A rubber molded product as defined in claim 1 wherein 25 to 75 wt. % of the fluororubber and 75 to 25 wt. % of the acrylic rubber are used.

6. A rubber molded product as defined in claim 1 wherein the fluororubber is an iodine-containing fluororubber.

7. A process for preparing a rubber molded product by preforming a composition comprising 5 to 95% by weight of a fluororubber containing vinylidene fluoride copolymerized therein in a proportion of 45 to 88 mole % and having a number average molecular weight of 5,000 to 200,000, and 95 to 5% by weight of an acrylic rubber, and irradiating the preform with an ionizing radiation.

* * * * *